United States Patent
Coletrane-Pagan et al.

(10) Patent No.: US 10,031,596 B2
(45) Date of Patent: Jul. 24, 2018

(54) SENSITIVITY ADJUSTMENT FOR A POINTING DEVICE

(71) Applicant: Lenovo Enterprise Solutions (Singapore) Pte. Ltd., Singapore (SG)

(72) Inventors: Candice L. Coletrane-Pagan, Durham, NC (US); Jimmie Lee Brundidge, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 13 days.

(21) Appl. No.: 15/215,814

(22) Filed: Jul. 21, 2016

(65) Prior Publication Data

US 2018/0024647 A1    Jan. 25, 2018

(51) Int. Cl.
| | |
|---|---|
| *G06F 3/033* | (2013.01) |
| *G06F 3/038* | (2013.01) |
| *G06F 3/0489* | (2013.01) |
| *G06F 3/023* | (2006.01) |

(52) U.S. Cl.
CPC ............ *G06F 3/038* (2013.01); *G06F 3/023* (2013.01); *G06F 3/04892* (2013.01)

(58) Field of Classification Search
CPC ....... G06F 3/038; G06F 3/023; G06F 3/04892
USPC ................................................. 345/156–167
See application file for complete search history.

(56) References Cited

U.S. PATENT DOCUMENTS

| | | | | |
|---|---|---|---|---|
| 7,007,067 B1* | 2/2006 | Azvine | ................... | G06F 3/011 709/202 |
| 2002/0158846 A1* | 10/2002 | Clapper | ................ | G06F 3/0221 345/168 |
| 2009/0160774 A1* | 6/2009 | Lee | ..................... | G06F 3/03543 345/166 |
| 2011/0210917 A1* | 9/2011 | LaFave | ............... | G06F 3/04845 345/160 |
| 2012/0146900 A1* | 6/2012 | Ishimoto | ............ | G06F 3/04812 345/157 |
| 2015/0355733 A1* | 12/2015 | Chang | ................... | G06F 19/345 345/163 |

* cited by examiner

*Primary Examiner* — Nelson Rosario
*Assistant Examiner* — Andrew Lee
(74) *Attorney, Agent, or Firm* — Jeffrey L. Streets

(57) ABSTRACT

A computer program product includes a non-transitory computer readable storage medium having program instructions embodied therewith, wherein the program instructions are executable by a processor to cause the processor to perform a method. The method includes monitoring use of a user input device of a computer system relative to a graphical user interface (GUI) of an active application, wherein the user input device includes a pointing device, wherein user input to the pointing device controls movement of a pointer within the GUI, and wherein a software interface establishes a level of sensitivity between the user input to the pointing device and the resulting movement of the pointer. The method further includes determining a value of one or more parameters characterizing the use of the at least one user input device, and automatically adjusting the level of sensitivity in response to the value of the one or more parameters.

18 Claims, 3 Drawing Sheets

SENSITIVITY ADJUSTMENT FOR A POINTING DEVICE

BACKGROUND

Field of the Invention

The present invention relates to the operation of a pointing device, such as a touchpad or computer mouse.

Background of the Related Art

A pointing device allows a user to transform a physical gesture into input to a graphical user interface. Typical examples of a pointing device include a computer mouse, a touchpad, a pointing stick, trackball, joystick and a finger tracking system. For example, the user may physically move a computer mouse across a surface, such that the direction and magnitude of mouse movement are translated into movement of a pointer or mouse cursor on a display screen. Common pointers are graphical images in the shape of an angled arrow or hand with an outstretched index finger. Furthermore, the graphical image of the pointer may change with context, such as a double arrow used to indicate that a user can drag an edge of a window for the purpose of resizing the window. Some pointing devices, such as a computer mouse or touchpad, may be combined with one or more buttons that can be used to perform further types of gestures, such as click and drag.

A touchpad is a pointing device featuring a flat surface with internal sensors that translate the motion and position of a user's finger that is in contact with the flat surface into relative movement of a pointer on a display screen. Touchpads are commonly built into laptop computers, and may also be used as a substitute for a mouse where desk space is limited. A touchpad may also be an external accessory that is connected wirelessly or through a Universal Serial Bus (USB) port.

There are cases where a pointing device is "too sensitive" or "not sensitive enough." For example, a touchpad that is too sensitive may translate the finest finger movement into a large jump of the pointer such that it is difficult for a user to place the pointer in a desired position. Conversely, a touchpad that is not sensitive enough may cause such a small amount of pointer movement for a given amount of finger movement that the user must pick up their finger and set it down on the opposite edge of the touchpad in order to continue moving the pointer toward a desired position.

Fortunately, touchpad sensitivity may be adjusted by accessing control panel settings via a computer's operating system. Accordingly, a user can change the current touchpad sensitivity setting to a level that is suitable to the user.

BRIEF SUMMARY

One embodiment of the present invention provides a computer program product comprising a non-transitory computer readable storage medium having program instructions embodied therewith, wherein the program instructions are executable by a processor to cause the processor to perform a method. The method comprises monitoring use of at least one user input device of a computer system relative to a graphical user interface of an active application, wherein the at least one user input device includes a pointing device, wherein user input to the pointing device controls movement of a pointer within the graphical user interface, and wherein a software interface to the pointing device establishes a level of sensitivity between the user input to the pointing device and the resulting movement of the pointer within the graphical user interface. The method further comprises determining a value of one or more parameters characterizing the use of the at least one user input device, and automatically adjusting the level of sensitivity in response to the value of the one or more parameters.

DETAILED DESCRIPTION

Figure 1:
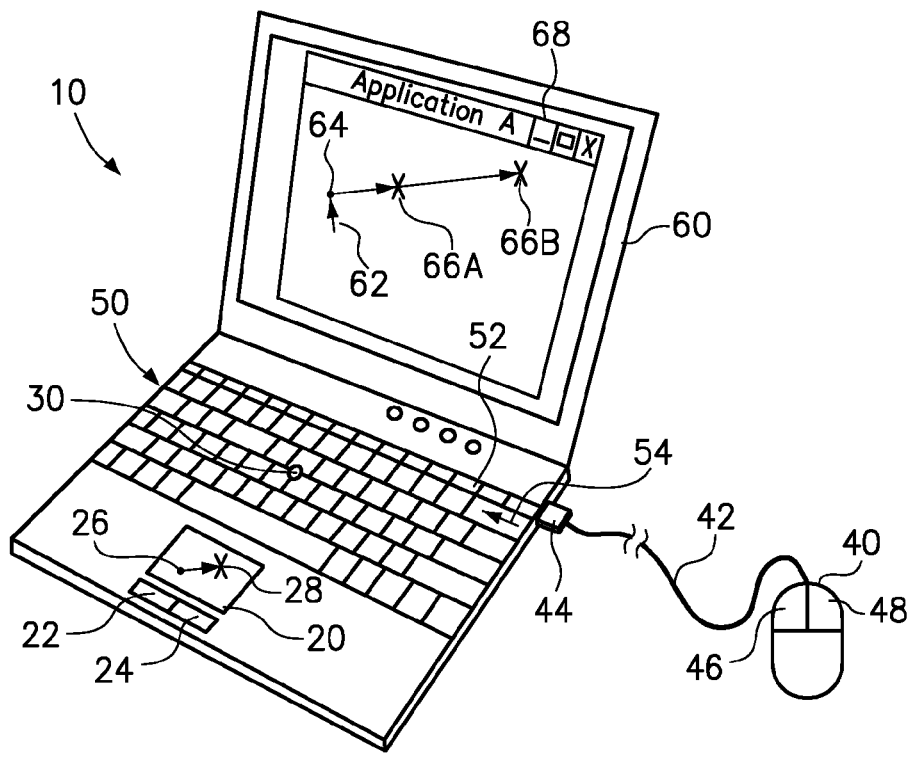
FIG. 1 is a laptop computer having a touchpad, pointing stick, USB mouse and a display screen.

One embodiment of the present invention provides a computer program product comprising a non-transitory computer readable storage medium having program instructions embodied therewith, wherein the program instructions are executable by a processor to cause the processor to perform a method. The method comprises monitoring use of at least one user input device of a computer system relative to a graphical user interface of an active application, wherein the at least one user input device includes a pointing device, wherein user input to the pointing device controls movement of a pointer within the graphical user interface, and wherein a software interface to the pointing device establishes a level of sensitivity between the user input to the pointing device and the resulting movement of the pointer within the graphical user interface. The method further comprises determining a value of one or more parameters characterizing the use of the at least one user input device, and automatically adjusting the level of sensitivity in response to the value of the one or more parameters.

A computer system is a general purpose device that can be programmed to carry out a set of logical operations. The computer system generally includes at least one processing element and some form of memory. Furthermore, the computer system may include a user input device, such as a keyboard or pointing device, which allows a user to provide input to the computer system. Often, the computer system will include a display screen that displays images, such as a graphical user interface generated by an application program running on the computing system. A pointing device is hardware that allows a user to provide user input in the form of spatial information, such as control of the movement and position of a pointer in the graphic user interface of an active application. Non-limiting examples of the user input to the pointing device include a directional movement over a distance and a directional force. Non-limiting examples of a pointing device include a computer mouse, touchpad, pointing stick, trackball, joystick, puck, finger tracking system, and eye tracking system. Embodiments of the present invention may also be equally applicable to other pointing devices now known or developed in the future. Since various pointing devices work on different principles, the nature of the user input may vary as appropriate to cause a desired movement of the pointer. A level of sensitivity (or responsiveness) of a pointing device establishes an amount of pointer movement within a graphical user interface that will result from a given amount of user input to the pointing device.

The method includes monitoring use of at least one user input device of a computer system relative to a graphical user interface of an active application. Such monitoring may be performed by software running on the computing system that includes the at least one user input device. For example, the software may be either part of a standalone application program or plugin or may be part of an operating system, such as a pointing device driver or feature of the operating system shell. In one embodiment, monitoring use of the at least one user input device may include monitoring movement of the pointer within the graphical user interface. The method may then determine a value of one or more parameters characterizing the use of the at least one user input device by determining one or more parameters characterizing the movement of the pointer. For example, the method may measure an amount of the one or more parameters characterizing the movement of the pointer, such as a pointer speed or a number of directional changes prior to receiving a click entry. Other parameters characterizing pointer movement may be similarly determined or measured.

Embodiments of the present invention automatically adjust the level of sensitivity in response to the determined value of the one or more parameters. In one option, the automatic adjustment may include automatically adjusting the level of sensitivity in an amount that is a function of the value of the one or more parameters. For example, if a user is struggling to control a pointer and makes several small directional movements before clicking a desired location in a graphical user interface, then the level of sensitivity of the pointing device may be reduced as some mathematical function of the number of small directional movements. In a related option, the automatic adjustment may include automatically adjusting the level of sensitivity from a first sensitivity level to a second sensitivity level in response to the value of one of the parameters exceeding a predetermined value. For example, the level of sensitivity of the pointing device may be reduced in response to the number of small directional movements prior to receiving a click exceeding a predetermined integer value, such as two. In this option, if a user has made more than two small directional movements prior to clicking into the graphical user interface, then the level of sensitivity for the pointing device is reduced.

In other embodiments of the present invention, the at least one user input device further includes a keyboard. Accordingly, the computer system includes at least two user input devices, including a pointing device and a keyboard. This configuration of a computing system is common for many types of computing systems, such as a laptop computer or desktop computer. Typically, a laptop computer will include a built-in track pad and a desktop computer will be provided with a computer mouse. However, a track pad and a computer mouse may be physically or wirelessly connected to either type of computing system. In fact, a computing system may include multiple pointing devices, which the user selects for use in different situations or for interaction with different applications or different tasks within an application.

In embodiments involving a keyboard, the computer system may monitor use of the at least one user input device by monitoring use of at least one correction key, such as a backspace key or a delete key, or cursor movement key, such as a tab key or an arrow key. More specifically, the computer system may monitor use of at least one correction key or cursor movement key of the keyboard subsequent to receiving a click entry from the pointing device, which may indicate that the user was unable to timely position the pointer in exactly the desired position of the graphical user interface prior to clicking.

In a further option, the one or more parameters characterizing the use of the at least one user input device may be a frequency with which the at least one correction key or cursor movement key is used subsequent to receiving a click entry from the pointing device. For example, a frequency might be expressed as a percentage or ratio of instances that a correction or cursor movement key is used immediately following a click, or a number of instances per unit of time.

Furthermore, the level of sensitivity may be automatically adjusted by incrementally adjusting the level of sensitivity of the pointing device. In one example, the method may further comprise determining whether the incrementally adjusted level of sensitivity results in a change in the frequency with which the at least one correction key or cursor movement key is used subsequent to receiving a click entry from the pointing device, and continuing use of the pointing device with the adjusted sensitivity level that results in a lowest frequency of use of the at least one correction key or cursor movement key. Accordingly, the level of sensitivity may be incrementally reduced in response to an increased use of a correction key or cursor movement key. Still further, if a timer indicates that it requires the user more than a setpoint amount of time to move the pointer from one point to another, then the level of sensitivity may be increased. Desirably, an optimal level of sensitivity may be achieved where the use of a correction key or cursor movement key is reduced, and the amount of time spent moving the pointing device is reduced.

Embodiments of the present invention may further comprise storing the adjusted level of sensitivity for the pointing device in association with one or more conditions under which the one or more parameters were determined. Non-limiting examples of the one or more conditions include an identity of the application, a type of the application, a type of the pointing device, a hardware configuration of the computer system, a time of day, and combinations thereof. By storing the adjusted level of sensitivity in association with one or more conditions under which the one or more parameters were determined, the computer system may return to the adjusted level of sensitivity as the one or more conditions change. Optionally, level of sensitivity data may stored be in a sensitivity table that associates the adjusted level of sensitivity with the one or more condition under which the one or more parameters were determined. Such a sensitivity table, or alternative data structure, may store a separate level of sensitivity in association with any number of conditions and combinations of conditions. For example, the one or more condition may include an identity of the application, and a sensitivity table may store an adjusted level of sensitivity for each of a plurality of applications. In one specific example, the computing system may detect that the active application has changed from a first application to a second application, and immediately adjust the level of sensitivity from a first level of sensitivity to a second level of sensitivity stored in a sensitivity table in association with the second application without waiting for the second application to receive input from the pointing device. Accordingly, a user would benefit from using a pointing device having a level of sensitivity that is varied between applications or other conditions. Furthermore, the level of sensitivity for each set of conditions is automatically adjusted to improve performance of the pointing device, and eliminates the need for a user to manually adjust sensitivity settings of a pointing device.

System configuration may also be used as a condition that may be associated with a level of sensitivity. For example, if a second monitor (display screen) is connected, then the pointing device may be used differently and a separate level of sensitivity may be determined and applied. In fact, the level of sensitivity may be adjusted to be different among the multiple monitors, such as a lower level of sensitivity on a secondary monitor. As another example, if the computing system detects that the user has plugged in a USB mouse, the computing system may automatically adjust the level of sensitivity for the USB mouse. This may reflect that the user's previous use of a USB mouse is associated with subsequent fine pointer control, such as for graphic design.

Embodiments of the invention recognize that there are certain applications that may be identified as needing a high level of human fine motor skill usage, such as certain art related applications and photo editing applications. When such applications are open, the computing system can automatically adjust the level of sensitivity of the pointing device. There are other applications, such as some text editing applications, which may require very limited use of a pointing device. As the user switches between active applications, the pointing device sensitivity may be adjusted based on the application properties. An active application is an application running in a currently focused window, which will receive any input from the pointing device or keyboard. In some window-based operating systems, a user may change the active window by clicking on a desired window, moving the pointer over the desired window, or entering a keyboard command, depending upon the specific operating system.

A time of day may also be used as one of the conditions for adjusting the level of sensitivity associated with a pointing device. For example, a user may typically use a mouse at work due to a high volume of work activity and a requirement for more fine and tedious pointer control. However, in the evening after a given time of day, the same user may prefer a different level of sensitivity due to physical fatigue, leisure activity, or a greater likelihood of using a hobby-related application.

Embodiments of the present invention may be implemented in computer program products including program instructions for implementing or initiating any one or more aspects of the methods described herein. Accordingly, a separate description of the methods will not be duplicated in the context of a computer program product.

FIG. 1 is a laptop computer 10 having a touchpad 20, pointing stick 30, USB mouse 40, a keyboard 50 display screen 60. The touchpad 20 is built into a base of the laptop computer 10 and forms a flat surface with sensors to detect movement of a user's finger over the flat surface. The touchpad 20 is associated with a left button 22 and a right button 24 that allow the user to click or access certain features of functions associated with the location of a pointer 62 within an active graphical user interface displayed on the display screen 60. As a user's finger moves across the surface of the touchpad 20 from a first position 26 to a second position 28, the pointer 62 moves from a first position 64 to a second position (such as position 66A or position 66B) in the graphical user interface 68. A software setting determines a level of sensitivity between the magnitude of a user's finger movement on the touchpad 20 and the magnitude of a pointer's movement on the graphical user interface 68. For a given amount of finger movement on the surface of the touchpad 20 from the first position 26 to the second position 28, movement of the pointer 62 from the first position 64 to the second position 66A represents a lower level of sensitivity than a movement of the pointer 62 from the first position 64 to the second position 66B.

The pointing stick 30 is positioned within the keys of the keyboard 50. A user may apply a directional force on the pointing stick 30 to cause the pointer 62 to move with the graphical user interface 68 in the direction of the force at a speed in proportion to the magnitude of the force. The level of sensitivity of the pointing stick 30 determines how fast the pointer 62 moves within the graphical user interface 68 as the result of a given amount of force applied to the pointing stick 30. A higher level of sensitivity may cause the pointer 62 to move faster for a given amount of applied force.

The USB (Universal Serial Bus) mouse 40 has a cable 42 terminating in a USB plug 44 that mates with a USB port in the base of the laptop computer 10. The USB mouse 40 further includes a left button 46 and a right button 48 for use in a manner similar to the left button 22 and the right button 24 of the touchpad 20. Unlike the touchpad 20, the mouse 40 is moved over a flat surface, such as a mouse pad or desk, such that the direction and magnitude of the movement control movement of the pointer 62 within the graphical user interface 68.

The keyboard 50 may have any of a number of standard layouts, such as a QWERTY layout. Regardless of the layout, the keyboard 50 may include one or more corrective keys, such as a delete key 52 or a backspace key 54. Optionally, the keyboard may include cursor movement keys (not shown), such as a left arrow (←), a right arrow (→), an up arrow (↑), and a down arrow (↓).

Figure 2A:
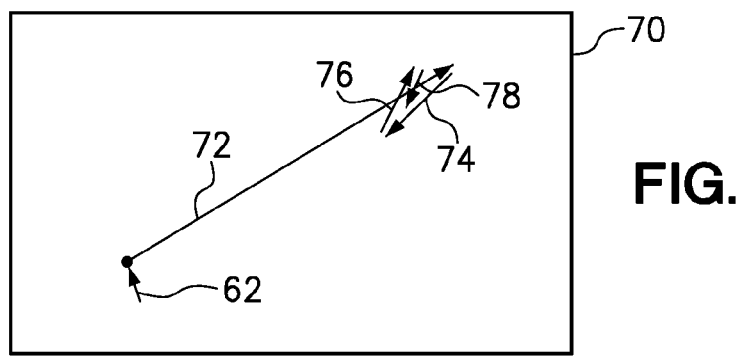
FIG. 2A is a schematic diagram of a pointer in a first graphical user interface.

FIG. 2A is a schematic diagram of the pointer 62 in a first graphical user interface 70. The diagram illustrates an example of a user controlling movement of the pointer 62 with a pointing device (such as the touchpad 20 of FIG. 1), but making multiple redirections of the pointer 62 before arriving at a desired position to enter a click or take other action. The path of each movement is indicated by an arrow, with each subsequent movement being a smaller redirected movement than the previous movement. Specifically, this example shows that it takes the user four consecutive movements 72, 74, 76, 78 to position the pointer 62 in a desired location of the graphical user interface 70. This type of redirected movement is an indication that pointing device being used has a level of sensitivity that is too high and should be reduced. Accordingly, embodiments of the invention may use the number of redirected movements as a parameter of pointer movement.

Figure 2B:
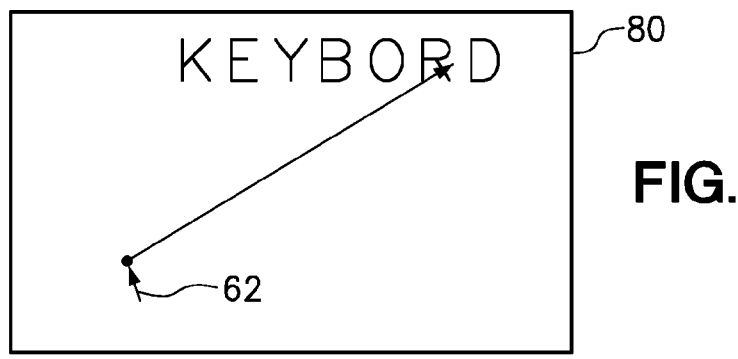
FIG. 2B is a schematic diagram of a pointer in a first graphical user interface.

FIG. 2B is a schematic diagram of the pointer 62 in a second graphical user interface 80. In this example, a user has positioned the pointer 62 between an "R" and a "D". If the user clicks into the text with the pointer 62 in the position between the "R" and the "D", then backspaces over the "R" before inserting an "AR", it may be interpreted that the user actually intended to position the pointer 62 between the "O" and the "R" since the net effect of the deletion and insertion is the insertion of an "A" to complete/correct the word "KEYBOARD". This use of a corrective key is an indication that the pointing device being used has a level of sensitivity that is too high and should be reduced. Accordingly, embodiments of the invention may use a frequency of corrective key use, or cursor movement key use, as a parameter of pointer movement.

Figure 3:
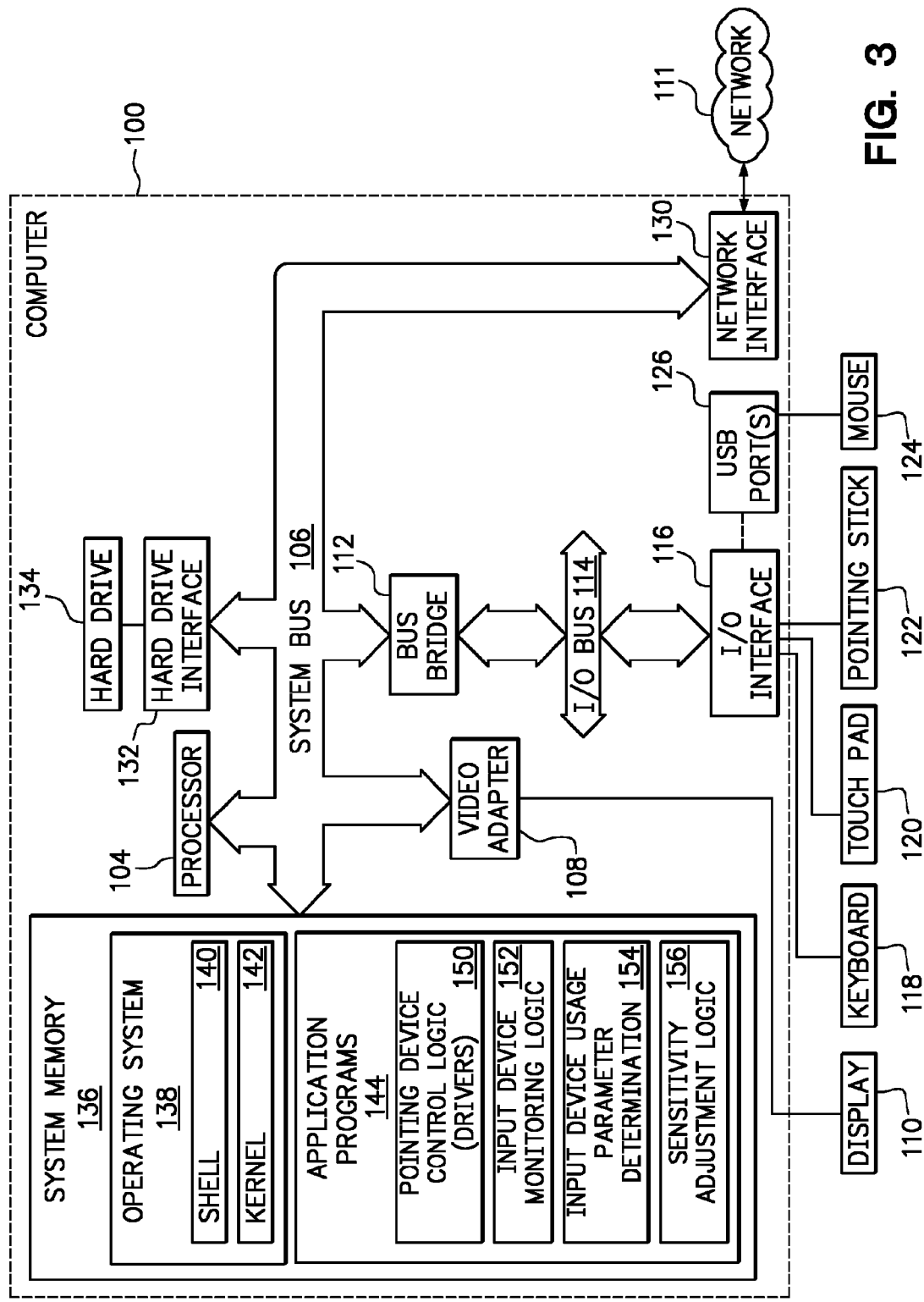
FIG. 3 is a diagram of a computer system suitable for implementing embodiments of the present invention.

FIG. 3 is a diagram of a computer 100 that may be representative of the laptop computer 10 of FIG. 1 or another computer system capable of implementing embodiments of the present invention. The computer 100 includes a processor unit 104 that is coupled to a system bus 106. The processor unit 104 may utilize one or more processors, each of which has one or more processor cores. A video adapter 108, which drives/supports a display 110, is also coupled to system bus 106. The system bus 106 is coupled via a bus bridge 112 to an input/output (I/O) bus 114. An I/O interface 116 is coupled to the I/O bus 114. The I/O interface 116 affords communication with various I/O devices, including a keyboard 118, a touchpad 120, a pointing stick 122, a USB mouse 124, a printer 124, and USB port(s) 126. As depicted, the computer 100 is able to communicate with other network devices via the network 111 using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory includes additional higher levels of volatile memory (not shown), including, but not limited to, cache memory, registers and buffers. Data that populates the system memory 136 includes the operating system (OS) 138 and application programs 144.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while the shell 140 may be a text-based, line-oriented user interface, the present invention may support other user interface modes, such as graphical, voice, gestural, etc.

As depicted, the operating system 138 also includes the kernel 142, which includes lower levels of functionality for the operating system 138, including providing essential services required by other parts of the operating system 138 and application programs 144, including memory management, process and task management, disk management, and mouse and keyboard management. As shown, the computer 100 includes application programs 144 in the system memory of the computer 100 as may be utilized by the laptop computer 10 of FIG. 1, including, without limitation, the pointing device control logic (drivers) 150, the input device monitoring logic 152, the input device usage parameter determination logic 154, and the sensitivity adjustment logic 156. The logic modules may be used to implement one or more of the embodiments discloses herein. Optionally, one or more aspect of the logic modules 150, 152, 154, 156 may be implemented in the operating system 138, rather than the applications 144.

The hardware elements depicted in the computer 100 are not intended to be exhaustive, but rather are representative. For instance, the computer 100 may include alternate memory storage devices such as magnetic cassettes, digital versatile disks (DVDs), Bernoulli cartridges, and the like. These and other variations are intended to be within the scope of the present invention.

Figure 4:
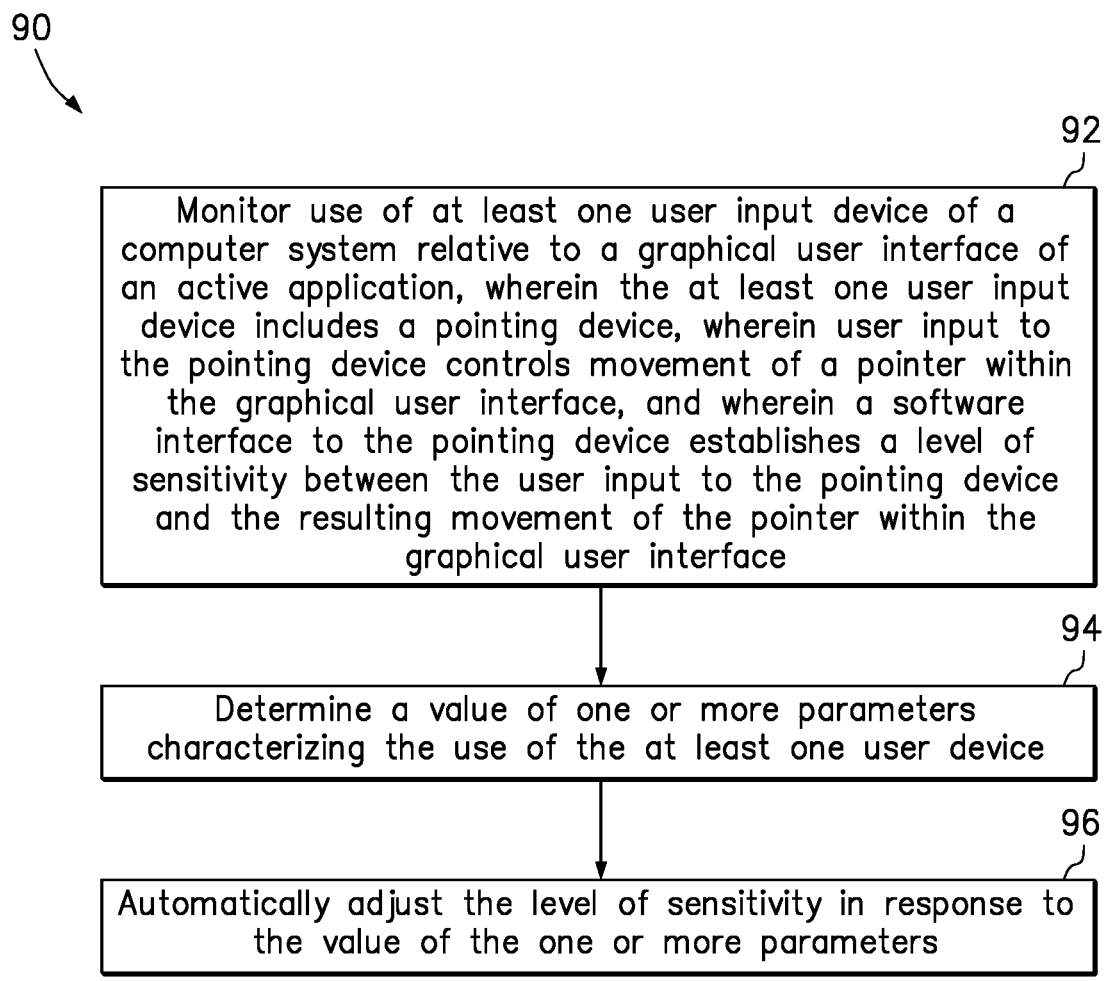
FIG. 4 is a flowchart of a method according to one embodiment of the present invention.

FIG. 4 is a flowchart of a method 90 according to one embodiment of the present invention. In step 92, the method monitors use of at least one user input device of a computer system relative to a graphical user interface of an active application, wherein the at least one user input device includes a pointing device, wherein user input to the pointing device controls movement of a pointer within the graphical user interface, and wherein a software interface to the pointing device establishes a level of sensitivity between the user input to the pointing device and the resulting movement of the pointer within the graphical user interface. In step 94, the method determines a value of one or more parameters characterizing the use of the at least one user input device. In step 96, the method automatically adjusts the level of sensitivity in response to the value of the one or more parameters.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as non-transitory program instructions in a computer readable storage medium that can direct a computer, other programmable data processing apparatus, or other devices to function in a particular manner, such that the program instructions stored in the computer readable storage medium produce an article of manufacture including non-transitory program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a non-transitory computer readable storage medium having program instructions embodied therewith, the program instructions executable by a processor to cause the processor to perform a method comprising:
   monitoring use of at least one user input device of a computer system relative to a graphical user interface of an active application, wherein the at least one user input device includes a pointing device, wherein user input to the pointing device controls movement of a pointer within the graphical user interface, and wherein a software interface to the pointing device establishes a level of sensitivity between the user input to the pointing device and the resulting movement of the pointer within the graphical user interface;
   determining a value of one or more parameters characterizing the use of the at least one user input device;
   automatically adjusting the level of sensitivity in response to the value of the one or more parameters; and
   storing the adjusted level of sensitivity for the pointing device in a sensitivity table that associates the adjusted level of sensitivity with one or more condition under which the one or more parameters were determined.

2. The computer program product of claim 1, wherein the pointing device is selected from a computer mouse, touchpad, pointing stick, trackball, joystick, puck, finger tracking system and eye tracking system.

3. The computer program product of claim 1, wherein monitoring use of the at least one user input device, includes monitoring movement of the pointer within the graphical user interface, and wherein determining a value of one or more parameters characterizing the use of the at least one user input device, includes determining one or more parameters characterizing the movement of the pointer.

4. The computer program product of claim 3, wherein determining one or more parameters characterizing the movement of the pointer, includes measuring an amount of the one or more parameters characterizing the movement of the pointer.

5. The computer program product of claim 4, wherein the one or more parameters characterizing the movement of the pointer include pointer speed.

6. The computer program product of claim 1, wherein automatically adjusting the level of sensitivity in response to the value of the one or more parameters, includes automatically adjusting the level of sensitivity in an amount that is a function of the value of the one or more parameters.

7. The computer program product of claim 1, wherein automatically adjusting the level of sensitivity in response to the value of the one or more parameters, includes automatically adjusting the level of sensitivity from a first sensitivity level to a second sensitivity level in response to the value of one of the parameters exceeding a predetermined value.

8. The computer program product of claim 1, wherein the at least one user input device further includes a keyboard.

9. The computer program product of claim 8, wherein monitoring use of the at least one user input device includes monitoring use of at least one correction key or cursor movement key of the keyboard subsequent to receiving a click entry from the pointing device.

10. The computer program product of claim 9, wherein the at least one correction key or cursor movement key includes a correction key selected from a backspace key and a delete key.

11. The computer program product of claim 9, wherein the at least one correction key or cursor movement key includes a cursor movement key selected from a tab key and an arrow key.

12. The computer program product of claim 9, wherein determining a value of one or more parameters characterizing the use of the at least one user input device, includes determining a frequency with which the at least one correction key or cursor movement key is used subsequent to receiving a click entry from the pointing device.

13. The computer program product of claim 12, wherein automatically adjusting the level of sensitivity in response to the value of the one or more parameters, includes incrementally adjusting the level of sensitivity of the pointing device.

14. A computer program product comprising a non-transitory computer readable storage medium having program instructions embodied therewith, the program instructions executable by a processor to cause the processor to perform a method comprising:
monitoring use of at least one user input device of a computer system, wherein the at least one user input device includes a pointing device and a keyboard, wherein user input to the pointing device controls movement of a pointer within a graphical user interface of an active application, wherein a software interface to the pointing device establishes a level of sensitivity between the user input to the pointing device and the resulting movement of the pointer within the graphical user interface, and wherein monitoring use of the at least one user input device includes monitoring use of at least one correction key or cursor movement key of the keyboard subsequent to receiving a click entry from the pointing device;
determining a value of one or more parameters characterizing the use of the at least one user input device, including determining a frequency with which the at least one correction key or cursor movement key is used subsequent to receiving a click entry from the pointing device;
automatically adjusting the level of sensitivity in response to the value of the one or more parameters, including incrementally adjusting the level of sensitivity of the pointing device;
determining whether the incrementally adjusted level of sensitivity results in a change in the frequency with which the at least one correction key or movement key is used subsequent to receiving a click entry from the pointing device; and
continuing use of the pointing device with the adjusted sensitivity level that results in a lowest frequency of use of the at least one correction key or cursor movement key.

15. The computer program product of claim 1, wherein the one or more condition is selected from an identity of the application, a type of the application, a type of the pointing device, a hardware configuration of the computer system, a time of day, and combinations thereof.

16. The computer program product of claim 1, wherein the one or more condition includes an identity of the application.

17. A computer program product comprising a non-transitory computer readable storage medium having program instructions embodied therewith, the program instructions executable by a processor to cause the processor to perform a method comprising:
monitoring use of at least one user input device of a computer system relative to a graphical user interface of an active application, wherein the at least one user input device includes a pointing device, wherein user input to the pointing device controls movement of a pointer within the graphical user interface, and wherein a software interface to the pointing device establishes a level of sensitivity between the user input to the pointing device and the resulting movement of the pointer within the graphical user interface;
determining a value of one or more parameters characterizing the use of the at least one user input device;
automatically adjusting the level of sensitivity in response to the value of the one or more parameters;
storing the adjusted level of sensitivity for the pointing device in association with one or more condition under which the one or more parameters were determined, wherein the one or more condition includes an identity of the application; and
detecting that the active application has changed from a first application to a second application, wherein automatically adjusting the level of sensitivity in response to the value of the one or more parameters, includes immediately adjusting the level of sensitivity from a first level of sensitivity to a second level of sensitivity stored in a sensitivity table in association with the second application without waiting for the second application to receive input from the pointing device.

18. The computer program product of claim 1, wherein the user input to the pointing device is selected from a directional movement over a distance and a directional force.

* * * * *